(12) United States Patent
Brophy, III et al.

(10) Patent No.: US 6,312,022 B1
(45) Date of Patent: Nov. 6, 2001

(54) PIPE JOINT AND SEAL

(75) Inventors: Lawrence John Brophy, III, Trenton; Kurry Brian Emmons, Neshanic Station, both of NJ (US)

(73) Assignee: Metex Mfg. Corporation, Edison, NJ (US)

(*) Notice: Subject to any disclaimer, the term of this patent is extended or adjusted under 35 U.S.C. 154(b) by 0 days.

(21) Appl. No.: 09/535,188

(22) Filed: Mar. 27, 2000

(51) Int. Cl.$^7$ .................................................. F16L 27/04
(52) U.S. Cl. ........................ 285/268; 285/334.4; 277/626
(58) Field of Search ........................... 285/334.1, 334.4, 285/268, 271, 267, 328, 49; 277/607, 626, 608

(56) References Cited

U.S. PATENT DOCUMENTS

| | | |
|---|---|---|
| 3,165,339 | 1/1965 | Faccou . |
| 3,258,278 | * 6/1966 | Miller, Jr. ........................ 285/334.4 |
| 4,097,071 | 6/1978 | Crawford et al. . |
| 4,133,558 | 1/1979 | Ahlstone . |
| 4,223,922 | 9/1980 | Pape . |
| 4,452,474 | * 6/1984 | Hanger .............................. 285/334.1 |
| 4,583,768 | 4/1986 | Aoki et al. . |
| 4,881,759 | * 11/1989 | Kovitch et al. ......................... 285/49 |
| 4,893,847 | 1/1990 | Hess . |
| 4,928,998 | 5/1990 | Brandener . |
| 5,203,593 | 4/1993 | Brandener . |
| 5,393,108 | 2/1995 | Kerr . |
| 5,683,119 | 11/1997 | Emmons et al. . |
| 5,779,282 | 7/1998 | Ezze . |
| 5,966,932 | 10/1999 | Yahagi . |

* cited by examiner

Primary Examiner—Lynne H. Browne
Assistant Examiner—Kenn Thompson
(74) Attorney, Agent, or Firm—Carelin Byrne Bain Gilfillan et al.; John G. Gilfillan III; William Squire

(57) ABSTRACT

Two steel pipes are each connected to a mounting flange for joining the two pipes, the flanges in one embodiment being fixed stationary to each other and in a second embodiment fixed movable relative to each other. A compressed knitted wire mesh seal is between the two flanges in a dynamic embodiment. Each flange has a spherical inner concave or outer convex surface and the seal has an inner concave and outer convex spherical surface. The seal outer convex spherical surface has a radius smaller than the mating flange concave inner surface. The origins of the two radii are offset. The seal inner concave spherical surface has a radius that is larger than the mating spherical outer convex surface of the corresponding flange. The seal contacts the two flanges in an annular set of pressure points to provide enhanced sealing action. In a second embodiment, the pipes are fixed stationary relative to each other and the outer flange is connected to a pipe spherical segment which segment has an inner concave spherical surface which engages the seal outer convex surface. The radii of the mating surfaces are different to provide enhanced sealing pressure points at the tangency of the mating surfaces.

10 Claims, 3 Drawing Sheets

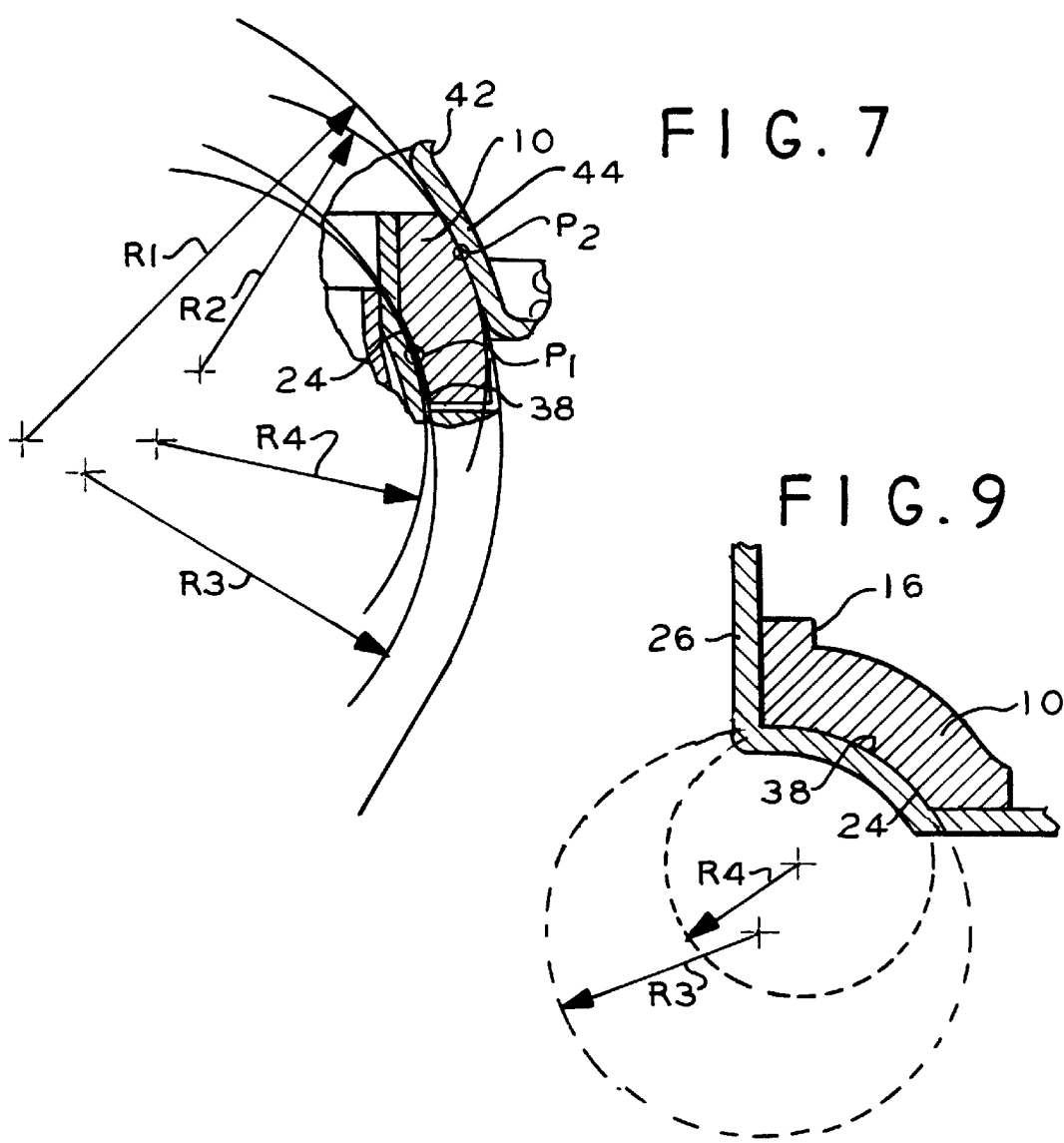

PIPE JOINT AND SEAL

This invention relates to pipe joints employing spherical seals for automotive exhaust systems.

Of interest is commonly owned U.S. Pat. No. 5,683,119 incorporated by reference herein.

U.S. Pat. No. 3,165,339 discloses a swivel pipe coupling. However, this coupling is for low temperature fluids, e.g., liquids at minus 300° F. (−185° C.). This coupling employs a thermoplastic sealing ring which is not acceptable for high temperature exhaust gases.

Pipe joints for certain automotive exhaust systems employ seals with spherical surfaces. For example, prior art joints and seals are disclosed in U.S. Pat. Nos. 5,499,825 and 5,040,805, incorporated by reference herein. Typical exhaust joints comprise a seal, usually formed into a preform of a wire mesh and filler material, and then crushed by dies to the end seal shape as illustrated in the aforementioned patents. The seals may be rigid or compliant in accordance with the seal construction. A lubricant or lubricating material is incorporated in the seal to provide a lubricating surface.

The seals are annular with a radially outer convex spherical segment surface and opposing planar end surfaces as shown in U.S. Pat. No. 5,499,825. In this patent, circular cylindrical through bore communicates with the planar end surfaces for receiving a pipe concentric with the spherical annular surface. A flange is welded in fixed position to the received pipe spaced from the pipe end edge and has a planar surface abutting one of the seal planar surfaces. The flange fixes the axial position of the seal. The seal spherical surface terminates adjacent to the flange. The other planar surface of the seal terminates approximately flush with the pipe end edge. The seal thus has an annular bore surface abutting the pipe outer circumference and a circular disc-like plane surface normal to the bore abutting the flange.

A second movable flange has a concave surface mating with the seal convex surface to form a dynamic engagement therewith. The two flanges each have a pair of aligned apertured flange members. A bolt is screwed to the flange members of the fixed flange. A compression spring is between each flange member of the movable flange and captured to the bolt by a bolt head. The springs resiliently urge the dynamic flange concave surface in engagement with the seal convex surface.

A second pipe is secured to the dynamic flange. The second pipe thus can resiliently rotate relative to the first pipe about the engaged spherical surfaces. A similar joint is illustrated in U.S. Pat. No. 5,040,805. The purpose of these joints is to provide a relatively fluid tight seal for exhaust gases conducted through the pipes at the joint while permitting the pipes to move relative to one another.

Numerous other joints are known as disclosed in prior art patents which combine planar surfaces with spherical or inclined surfaces. For example, reference is made to U.S. Pats. Nos. 4,097,071, 4,133,558, 4,223,922, 4,452,474, 4,583,768, 4,928,998 among others.

The present inventors recognize a problem with the exhaust gas joints. They recognize that in such prior art joints the cylindrical and planar mating surfaces in abutment together do not provide a sufficiently fluid tight seal for the exhaust gases at the interface of the two joined pipes. They recognize that the fixed flange and mating pipe cylindrical mating surfaces and the flat surface of the seal with the mating flat flange surface provide a relatively high gas leakage path.

The aforementioned patent U.S. Pat. No. 5,683,119 solves the problems with these prior art joints. However, a need is seen for a less costly and more compact seal assembly for such exhaust systems.

A pipe joint and seal according to the present invention comprises a first flange for attachment to a first pipe and having a concave spherical inner surface defined by a first radius of a first magnitude. A second flange is for attachment to a second pipe and has a convex spherical outer surface defined by a second radius of a second magnitude. An annular seal has an outer convex spherical surface engaged with the first flange concave inner surface, the outer convex spherical surface of the seal being defined by a third radius of a third magnitude smaller than the first radius magnitude, the seal having an inner concave spherical surface engaged with the second flange convex outer surface and defined by a fourth radius larger than the second flange convex outer second radius.

In one aspect, the seal comprises compressed wire mesh and a filler material.

In a further aspect, means rigidly connect the first and second flanges to each other.

In a still further aspect, means movably connect the first and second flanges to each other.

Preferably, the first and second pipes are included and include means for securing the first pipe to the first flange and the second pipe to the second flange.

In a further aspect, the seal includes an annular ridge extending radially outwardly from the outer convex surface radially aligned with the inner concave surface. The seal may have an inner annular bore surface adjacent to the inner concave surface and radially aligned with the outer convex surface.

The ridge is preferably intermediate the first and second flanges. In a further aspect, the seal outer convex surface is tangent to the first flange concave inner surface at a first point and the inner concave surface of the seal is tangent to the second flange convex outer surface at a second point, the points of tangency being radially offset from each other.

IN THE DRAWING

FIGS. 7–9 are diagrams useful for explaining the principles of the present invention.

Figure 1:
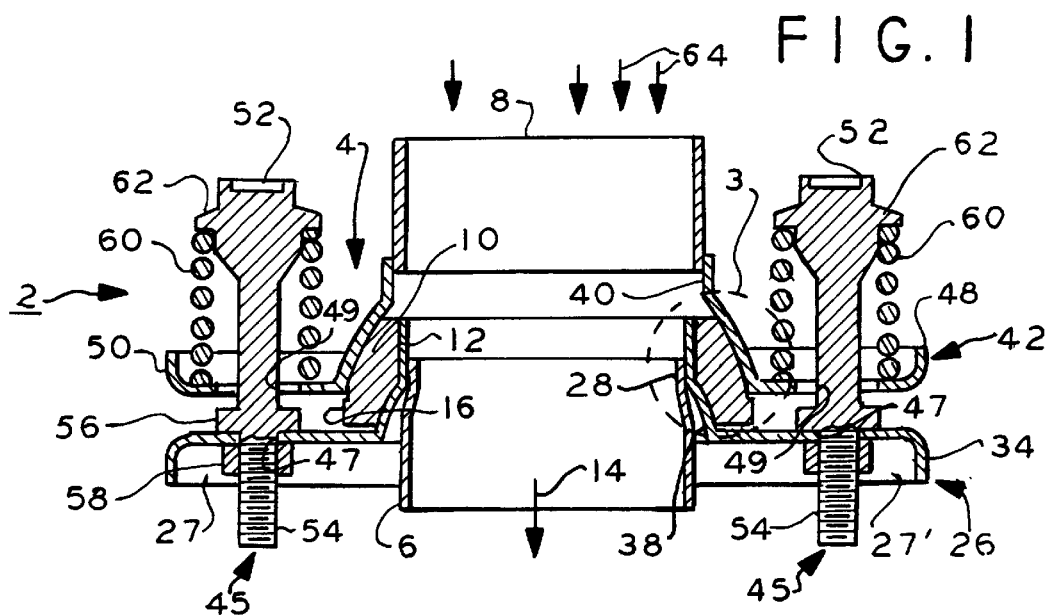
FIG. 1 is a sectional elevation view of a joint and seal according to one embodiment of the present invention.
Figure 2:
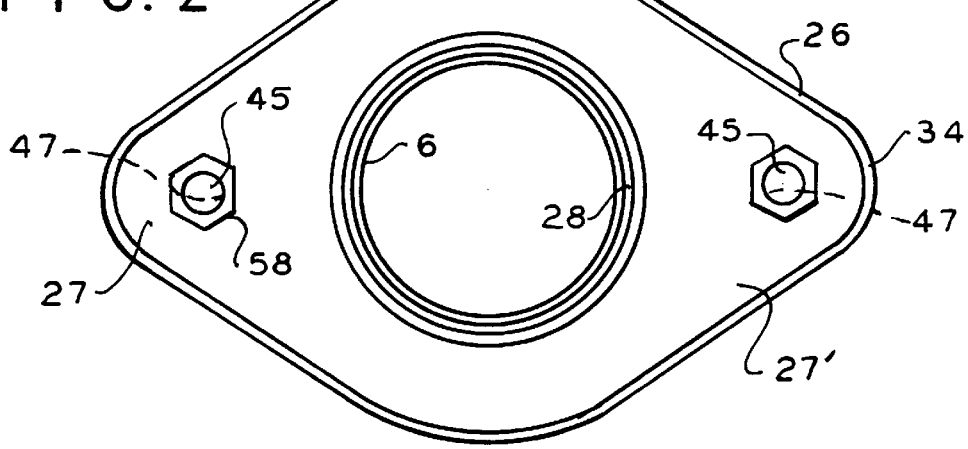
FIG. 2 is a bottom plan view of the joint of FIG. 1.
Figure 3:
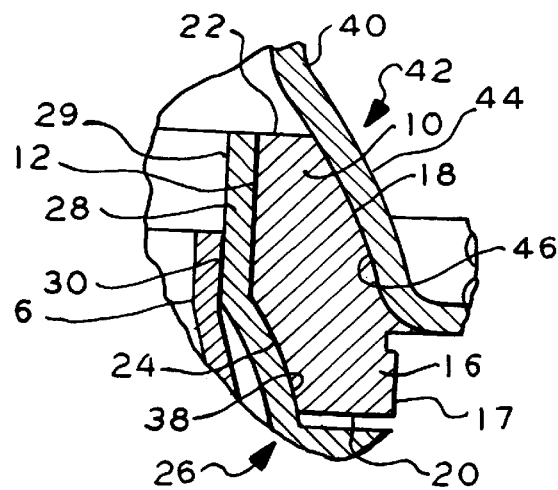
FIG. 3 is a more detailed view of the joint of FIG. 1 taken at region 3.

In FIGS. 1–3, joint assembly 2 of the present invention is particularly adapted for use with automotive exhaust systems. However, the assembly may be employed in other fluid distribution systems in which it is desired that one pipe be joined fixed or relatively movable with respect to a second pipe in the system. The assembly 2, FIG. 1, comprises a joint 4 for movably sealingly attaching a circular cylindrical, preferably stainless steel pipe 6 to a second circular cylindrical, preferably stainless steel, pipe 8. Pipes 6 and 8 are conventional for use in automotive exhaust systems for conveying hot toxic combustion engine exhaust gases.

In one such exhaust system, the joint must be essentially leak proof while permitting one pipe to rotate with three degrees of rotational freedom and no translation relative to the other. When automobiles, for example, are stationary, leaking exhaust gases may undesirably seep into the vehicle passenger cabin. If the joint is prior to the catalytic converter, untreated exhaust gas may escape. Under certain operating conditions, air can be drawn into the joint by a lower pressure within the joint.

In sophisticated systems, an oxygen sensor senses the oxygen content of the exhaust gas in the exhaust pipes. If air is drawn into the joint via a leak, the sensor may sense an erroneous lean condition. A computer in response may cause a richer mixture of fuel-air to be supplied to the engine, resulting in higher undesirable emissions and poorer fuel economy. The joint and seal of the present invention minimizes such leaks.

A seal 10 according to an embodiment of the present invention is preferably formed with a reinforcing matrix of a knitted wire mesh, which may be stainless steel and comprising wire of a diameter determined by a given implementation, a filler material which may be vermiculite or mica and a lubricant such as graphite. These materials may be combined according to a given implementation and may form a preform during a stage of fabrication of the seal. Examples of such preform materials are disclosed in the aforementioned U.S. Pat. Nos. 5,499,825 and 5,040,805, incorporated by reference herein. Also, disclosed in these patents are techniques for forming preforms for use in an automotive exhaust joint arrangement using seals of the type disclosed therein.

The resulting preform, generally planar, is flexible and wrapped about a mandrel to form a cylindrical structure as shown for example in U.S. Pat. Nos. 5,499,825 and 5,040,805, incorporated in their entirety by reference herein. For example, in U.S. Pat. No. 5,499,825, a knitted wire net of stainless steel fine wire is combined with a sheet of heat resistant material such as expanded graphite, mica or asbestos. A lubricating composition is then coated on the sheet material which is placed within the knitted wire mesh. This structure is then wrapped about a mandrel in a female die of cylindrical shape. A male cylindrical die is inserted into the female die compressing the preform material in the female die, forming the preform into the desired seal configuration.

Other forms of the composite material may include powder matrices added to the female die after the wire mesh is wrapped about a core in the female die. This powder matrix material tends to be external the wire mesh in the formed seal. The combination of materials is then compressed with a male die to form the seal.

In U.S. Pat. No. 5,040,805, a knitted wire mesh is wound about a core. An expanded graphite sheet is disposed over the uncoiled wire mesh. Both are wound cylindrically in succession on a partial cylindrical part and a preform body with a refractory material projecting on an end portion of the preform body is formed. Depending upon the wire mesh parameters, e.g., wire size and knit loop spacing, and the filler material, the resulting seal can be compliant or relatively rigid.

In one form, the lubricant may be a graphite sheet material wrapped about the wire mesh preform. In a further embodiment, a powder composite, a lubricating material such as graphite and the wire mesh are placed in the female die. When compressed, the resultant structure is relatively hard and rigid. The lubricating material is placed to form a lubricating surface on the seal for dynamic action with a mating flange surface.

The seal 10 is circular with a through bore 12 extending in axial direction 14. The seal 10, FIG. 3, has an annular outer cylindrical raised ridge 16 at one edge of the seal, the ridge having an annular outer circular cylindrical surface 17. The raised ridge 16 is next adjacent to an outer annular convex spherical surface 18. The surface 17 is normal to a planar seal annular washer-like end surface 20. The surface 18 is next to and joins annular washer-like flat surface 22 which is normal to bore 12 surface and parallel to surface 20. The seal convex surface 18 has a radius $R_2$, FIGS. 7 and 8, of a given magnitude. The seal surfaces 20 and 22 and bore 12 are normal to each other.

The seal 10 has a concave inner annular spherical surface 24 between the bore 12 and surface 20. The seal concave surface 24 has a radius $R_3$ of a given magnitude. The radii $R_2$ and $R_3$ have origins that are offset from each other, FIG. 7. The relative magnitudes of the radii are exaggerated and not to scale.

A flange 26, FIGS. 1–3, comprises preferably a stamped stainless steel sheet having an annular circular cylindrical segment 28 forming a bore 29 for closely receiving pipe 6. The segment 28 is welded to the pipe 6 to form a gas impervious seal between the leg 28 and pipe 6 in a continuous annular seam 30. The weld fixes the flange 26 axially to pipe 6. The weld is used to allow for hot exhaust gases. In the alternative, in an environment where heat is not a factor, other sealing arrangements may be employed for sealing and fixedly securing the pipe 6 to the flange 26.

The flange 26 has a preferably generally two mirror image triangular in plan view flange members 27, 27'. Members 27, 27' each comprise a planar generally triangular in plan view section each extending radially from opposite sides of cylindrical segment 28. A peripheral reinforcing rib 34 upstands from the legs members 27, 27' and central region of the flange 26. The shape and configuration of the flange may be in other forms according to a given implementation. A through aperture 47 is in each member 27, 27'.

An annular convex spherical flange portion 38, FIG. 3, extends from the segment 28 spaced about pipe 6 and connects to members 27, 27'. The flange portion 38 convex spherical surface engages and mates with the seal concave inner spherical surface 24 in relatively gas sealing relation about the pipe 6.

The flange portion 38 convex surface has a radius $R_4$. The radius $R_4$, FIGS. 7 and 9, is smaller than the radius $R_3$. As a result, in FIG. 7, the convex spherical flange portion 38 contacting the seal inner concave spherical surface 24 contacts the seal surface 24 at points of tangency $P_1$ lying in a circular line. This point of tangency is important. It provides compressive stress concentration of the sealing forces at the points $P_1$. This provides an enhanced sealing action in response to a given compressive load exerted between the flange 26 and seal 10. The concentrated load provides tighter sealing action as compared to the compressive load spread over an area A second outer flange 42, FIG. 3, has a circular cylindrical segment 40 that receives pipe 8. The segment 40 is welded to pipe 8 which weld forms a continuous fluid impervious seam about the pipe 8. In the alternative, fixation and sealing of the pipe 8 to the flange 42 may be by other structure for use with lower temperature fluids.

The segment 40 is connected to annular concave spherical flange portion 44. Portion 44 has concave spherical surface 46 that extends about and is in sealing mating engagement with seal 10 outer convex spherical surface 18. Flange members 48 and 50, FIG. 1, extend radially outwardly from portion 44 in opposite directions. Flange members 48 and 50 each have a bolt receiving aperture 49 aligned with and corresponding to the apertures 47 in flange members 27, 27'.

These apertures receive bolts 45. A second flange member 50 in mirror image relation to and identical to member 48 is on the opposite side of flange member 48, both flange members being connected to portion 44.

The apertures 49 of flange members 48 and 50 are axially aligned with the apertures 47 of the respective flange members 27, 27'. Bolt 45 is in each of the aligned aperture pairs of the respective aligned flange members 27, 27' and 48, 50. Bolt 45 has a head 52 at one end and a threaded stud 54 at its other end. A shoulder 56 is adjacent to the stud 54. A nut 58 axially locks the flange member 27 to the shoulder 56 in fixed axial position. The other bolt 45 is similarly secured to flange member 27' on the opposite side. The seal 10 is thus locked wedged between the mating outer convex spherical seal surface 18 and mating flange 42 inner concave surface 46 on the outer side of the seal and the seal inner concave surface 24 and flange 26 outer convex surface 38. The seal 10 is axially and radially wedged between flanges 26 and 42.

A compression coil spring 60 is between an annular flange 62 on each of the bolt heads 52 and respective flange members 48 and 50 and receives the respective bolts 45 therethrough. With the nuts 58 in place, the springs 60 are compressed and resiliently urge the flange 42 in direction 14. This action seats the flange 42 spherical concave portion 44 against the spherical seal outer convex surface 18 in substantial fluid tight but dynamic relation. This action also seats the seal 10 inner concave spherical surface 24 in fluid tight relation with the flange 26 portion 38 spherical outer convex surface.

The bolts 45 have a diameter smaller than apertures 47 and 49 so as to float transversely in these apertures. This floating action permits the flange 42 to rotate in response to rotation of the pipe 8 relative to pipe 6 with three degrees of rotation freedom and no translation.

In FIGS. 7 and 8, the flange 42 concave portion 44 concave surface 46 has a radius $R_1$. The seal 10 outer convex surface 18 has a radius $R_2$. The radius $R_1$, FIGS. 7 and 8, of the flange concave surface is larger than the seal 10 outer convex surface radius $R_2$. As a result, in FIG. 7, the concave spherical flange portion 38 contacting the seal inner convex spherical surface 18 contacts the seal surface 18 at points of tangency $P_2$ lying in a circular line. This point of tangency is important. It provides compressive stress concentration of the sealing forces at the points $P_2$. This provides an enhanced sealing action in response to a given compressive load exerted between the flange 42 and seal 10. The concentrated load provides tighter sealing action as compared to the compressive load spread over an area. Thus, the compressive loads at points $P_1$ and $P_2$ provide stress concentration to enhance the sealing action not otherwise provided in prior art seals having sealing loads spread over an area defined by the mating convex and concave surfaces. This stress concentration not only enhances the sealing action, it also helps reduce noise and wear on the seal. These points are provided by providing offset radii of the mating convex and concave spherical surfaces of the flanges and seal as shown in FIGS. 8 and 9.

In operation, the exhaust gas 64 flows through the pipes 6 and 8 and the junction therebetween. The gas 64 can not flow between the pipe 8 and flange 42 segment 40 to the ambient atmosphere because of the weld therebetween. Similarly the gas can not flow between segment 28 and the pipe 6 to the ambient atmosphere because of weld therebetween.

The gas 64 may follow two other paths. One path is between the seal 10 convex surface 1 and concave flange portion 44 surface 46. However, because the seal 10 is in engagement with the flange portion and is spherical, the leakage therebetween is minimized especially due to the stress concentration at point $P_2$.

The resilient axial load of the springs 62 forces the seal 10 generally in axial direction 14. The seal 10 inner concave surface seals against the flange 26 outer convex surface and is sealed by the stress concentration at point $P_1$. Thus the dynamic joint is substantially sealed from the flowing gases. This line stress concentration action of the spherical surfaces of different radii at the inner and outer surfaces of the seal 10 and mating flanges provides an improved fluid tight seal as compared to prior art seals which engage over relatively large surface areas.

Figure 4:
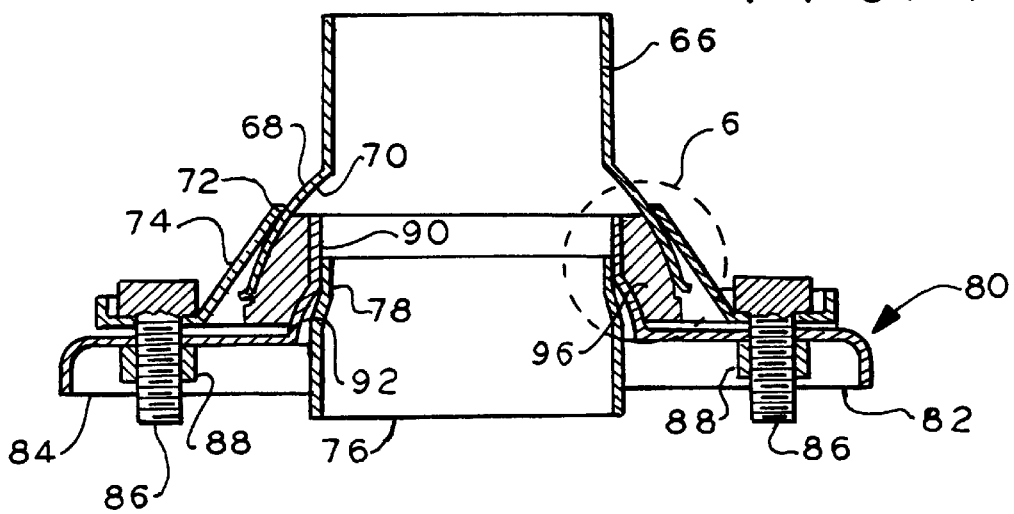
FIG. 4 is a sectional elevation view of a joint and seal according to a second embodiment of the present invention.
Figure 5:
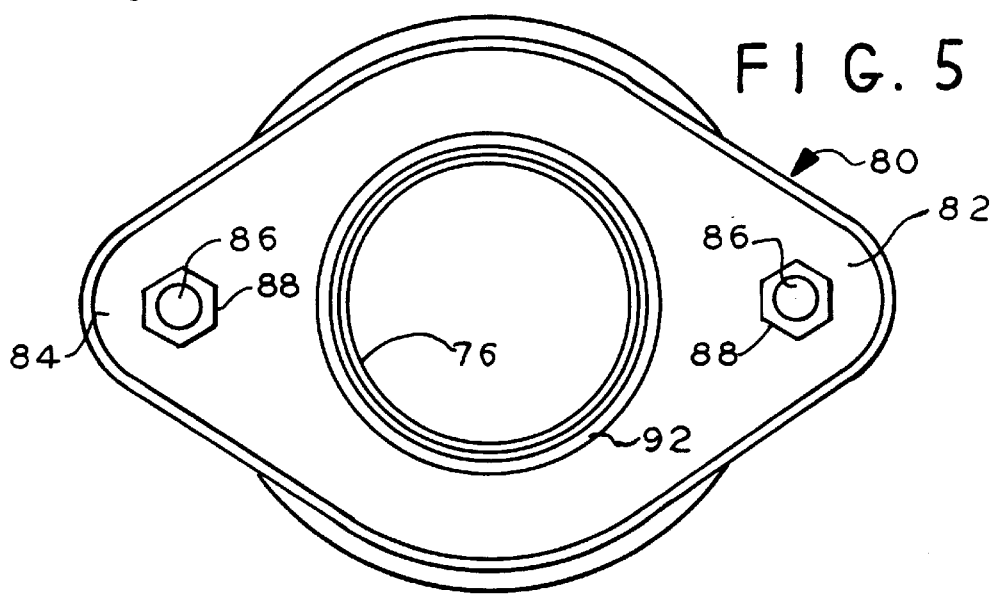
FIG. 5 is a bottom plan view of the joint of FIG. 4.
Figure 6:
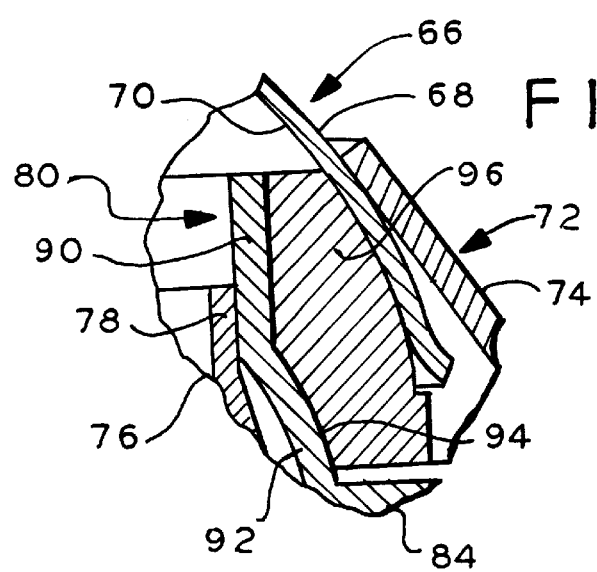
FIG. 6 is a more detailed view of the joint of FIG. 4 taken at region 6.

FIGS. 4, 5 and 6 illustrate a seal according to a further embodiment wherein the seal is for a static pipe joint. Pipe 66, which may be stainless steel, has an annular spherical segment 68. Segment 68 has an annular concave spherical surface 70. A flange 72 has a conical portion 74 welded to the exterior surface of the segment 68 in a gas tight annular seam.

Pipe 76, which may be stainless steel, is axially aligned to and rigidly fixed relative to pipe 66. Pipe 66 has an annular segment 78. Lower flange 80 has mirror image generally triangular shaped members 82 and 84. Flange 80 is secured rigidly fixed to flange 72 by bolts 86 and nuts 88. Flange 80 has a circular cylindrical segment 90 welded to the pipe 76 forming a gas tight annular seam. The flanges 72 and 80 are preferably stamped sheet steel.

The flange 80 has a spherical segment 92 having a convex annular spherical surface 94. Segment 92 terminates at members 82 and 84. Seal 96 is disposed between pipe 66 spherical segment 68 and flange 80 segments 90 and 92. The seal 96 has the same general shape as seal 10, FIGS. 1–3 and is made as discussed above in connection with seal 10. Seal 96 may be identical to seal 10. The mating spherical surfaces of the spherical segments 68 and 92 have the same radii relationship as the corresponding segment surfaces as described above for the embodiment of FIGS. 1–3 in connection with FIGS. 7–9. That is, there are annular stress concentration or pressure points $P_1$ and $P_2$ due to the different radii of the mating convex and concave surfaces of the corresponding mating spherical segments of the seal, pipe 66, seal 96 and flange 80. The difference is that pipe 66 is fixed relative to pipe 76 in FIGS. 4–6 whereas the pipe 8 is in dynamic relation relative to the pipe 6 of FIGS. 1–3. Gas leakage is precluded or minimized by the sealing action between seal 96 and pipe 66 and by the weld between flange 80 and pipe 76 and the sealing action between the seal 96 and flange 80. Thus all paths of the flowing gas are sealed.

It will occur to one of ordinary skill that modifications may be made to the disclosed embodiments. For example, the seals need not include the ridge 16 but may have an outer surface that is either partially or entirely spherical as desired for a given implementation. What is important is that the mating surfaces of the seal and flange spherical surfaces have different radii so as to provide pressure at a line contact rather than area contact. Both inner and outer flanges are coupled to the seal by such spherical mating surfaces. The pressure points $P_1$ and $P_2$ need not be spaced radially as shown in FIG. 7 but may be aligned radially according to a given implementation.

While the seals are preferably formed of knitted wire mesh, they may be formed as solid metal structures, e.g., powdered composite without a mesh reinforcement. Also, the seals may be forged, machined, cast or otherwise formed. The mesh may or may not be knitted. The reinforcement may be made of non-metallic materials. It is intended that the scope of the invention be defined by the appended claims, the description herein being given by way of illustration and not limitation.

What is claimed is:

1. A pipe joint and seal comprising:

a first flange for attachment to a first pipe and having a concave spherical inner surface defined by a first radius of a first magnitude;

a second flange for attachment to a second pipe and having a convex spherical outer surface defined by a second radius of a second magnitude; and an annular seal having an outer convex spherical surface engaged with the first flange concave inner surface and defined by a third radius of a third magnitude smaller than the first radius magnitude, the seal having an inner concave spherical surface engaged with the second flange convex outer surface and defined by a fourth radius larger than the second flange convex outer second radius.

2. The joint and seal of claim 1 wherein the seal comprises compressed wire mesh and a filler material.

3. The joint and seal of claim 1 including means for rigidly connecting the first and second flanges to each other.

4. The joint and seal of claim 1 including means for movably connecting the first and second flanges to each other.

5. The joint and seal of claim 1 including the first and second pipes and means for securing the first pipe to the first flange and the second pipe to the second flange.

6. The joint and seal of claim 1 wherein the seal includes an annular ridge extending radially outwardly from the outer convex surface radially aligned with the inner concave surface.

7. The joint and seal of claim 6 wherein the seal has an inner annular bore surface adjacent to the inner concave surface and radially aligned with the outer convex surface.

8. The joint and seal of claim 6 wherein the ridge is intermediate the first and second flanges.

9. The joint and seal of claim 1 wherein the seal outer convex surface is tangent to the first flange concave inner surface at a first set of annular points and the inner concave surface of the seal is tangent to the second flange convex outer surface at a second set of annular points.

10. The joint and seal of claim 9 wherein the points of tangency are offset radially from each other.

* * * * *